(12) United States Patent
Keten

(10) Patent No.: US 11,658,758 B2
(45) Date of Patent: May 23, 2023

(54) TIME TRANSFER SYSTEM AND METHOD FOR SATELLITE-INDEPENDENT, PHASE AND FREQUENCY SYNCHRONIZATION OVER TRADITIONAL IP CORE NETWORK WITHOUT FULL OR PARTIAL TIMING SUPPORT

(71) Applicant: TURK TELEKOMUNIKASYON ANONIM SIRKETI, Ankara (TR)

(72) Inventor: Umut Keten, Bursa (TR)

(73) Assignees: Umut Keten, Bursa (TR); TURK TELECOMMUNIKASYON ANONIM SIRKETI, Ankara (TR)

( * ) Notice: Subject to any disclaimer, the term of this patent is extended or adjusted under 35 U.S.C. 154(b) by 485 days.

(21) Appl. No.: 16/982,569

(22) PCT Filed: Sep. 24, 2019

(86) PCT No.: PCT/TR2019/050789
§ 371 (c)(1),
(2) Date: Sep. 20, 2020

(87) PCT Pub. No.: WO2021/015687
PCT Pub. Date: Jan. 28, 2021

(65) Prior Publication Data
US 2023/0106725 A1      Apr. 6, 2023

(30) Foreign Application Priority Data

Jul. 22, 2019   (TR) ................................. 2019/10960

(51) Int. Cl.
*H04J 3/06*         (2006.01)
(52) U.S. Cl.
CPC .......... *H04J 3/0667* (2013.01); *H04J 3/0638* (2013.01)

(58) Field of Classification Search
CPC ...... H04J 3/0638; H04J 3/0641; H04J 3/0647; H04J 2203/0001; H04J 3/0667; H04N 21/242
See application file for complete search history.

(56) References Cited

U.S. PATENT DOCUMENTS

| 7,606,541 | B1 | 10/2009 | Nicholls et al. |
| 9,838,196 | B2 * | 12/2017 | Ogawa ................. H04J 3/0638 |

(Continued)

FOREIGN PATENT DOCUMENTS

EP        3242423 A1    11/2017

OTHER PUBLICATIONS

"Dynamic synchronous Transfer Mode (DTM) Part 1: System description", ETSI, Jan. 2001 (Year: 2001).*

(Continued)

*Primary Examiner* — Omer S Mian
(74) *Attorney, Agent, or Firm* — Egbert, McDaniel & Swartz, PLLC

(57) ABSTRACT

A system and method capable of transporting phase and frequency synchronization over traditional IP/MPLS networks, making end terminals requiring signals received from satellites to have phase and frequency synchronisation obsolete. The method includes switching of PPS signal by DTM protocol, transmission of PPS signal to the other end of network through a virtual circuit, switching the transmitted PPS signal again by DTM protocol, conversion of PPS signal arriving at the other end to ToD and PTP data and transmission thereof to a terminal component. The system includes a transmitter mechanism converting ToD and PTP data into PPS signal on one end of the network and then switching by DTM protocol, a receiver mechanism switching PPS signal at DTM protocol on the other end of the network and converting into ToD and PTP data and transmitting to the end component, and a virtual circuit providing carriage of PPS signal.

8 Claims, 3 Drawing Sheets

(56) References Cited

U.S. PATENT DOCUMENTS

| | | | |
|---|---|---|---|
| 2012/0079310 A1 | 3/2012 | Matsusue et al. | |
| 2013/0091531 A1* | 4/2013 | Danielsson | H04J 3/0644 |
| | | | 725/116 |
| 2016/0269170 A1 | 9/2016 | Kurby | |
| 2017/0302392 A1 | 10/2017 | Farra et al. | |
| 2018/0242267 A1* | 8/2018 | Jiang | H04W 56/00 |

OTHER PUBLICATIONS

Checko et al, "Synchronization Challenges in Packet-based Cloud-RAN Fronthaul for Mobile Networks" 2015 (Year: 2015).*
Pearson, et al., "A Case for Assisted Partial Timing Support Using Precision Timing Protocol Packet Synchronization for LTE-A", 2014 (Year: 2014).*
Danielson, et al, "Time Transfer Capabilities in the DTM Transmission System", 2014 (Year: 2014).*
International Search Report and Written Opinion for corresponding PCT/TR2019/050789, dated May 11, 2020.
Danielson, M., "Time Transfer Capabilities in the DTM Transmission System", 2014 European Frequency and Time Forum (EFTF), Jun. 26, 2014.
Gasparini et al, "A Digital Circuit for Jitter Reduction of GPS-disciplined 1-pps Synchronization Signals", 2007 IEEE International Workshop on Advanced Methods for Uncertainty Estimation in Measurement, Jul. 18, 2007.

* cited by examiner

TIME TRANSFER SYSTEM AND METHOD FOR SATELLITE-INDEPENDENT, PHASE AND FREQUENCY SYNCHRONIZATION OVER TRADITIONAL IP CORE NETWORK WITHOUT FULL OR PARTIAL TIMING SUPPORT

TECHNICAL FIELD

Invention and Method relates to transfering of phase and frequency synchronization independent from signals received from satellites over traditional core carrier IP/MPLS networks.

Invention particularly relates to a phase and frequency synchronization transfer method based on conversion of the time information received from an atomic clock source as PPS or PPS plus string (Pulse Per Second) and then the transport of the time information to an far opposite end with the use of a point to point Virtual Circuit DIM (Dynamic Synchronous Transfer Mode) Protocol created over traditional core carrier IP/MPLS network.

Present State of the Art

A major part of current technological demands is meeting the required phase and frequency demands. Digital networks based on time division duplex (TDD) and C-RAN and in the future other also techniques require phase and frequency synchronisation. "Phase and frequency synchronization" meaning Phase synchronisation is usually applied to two waveforms of the same frequency with identical phase angles with each cycle. Frequency synchronization is a process that adjusts the relative frequency of one or more signals based on the frequency reference of another signal. "Phase and frequency synchronization" is a key factor in providing proper 5G and beyond technologies. [1] [2] [3]

Phase and frequency synchronization in the related art standardization is performed by ITU-T (1588) and IEEE G8275.1 (Full Timing Support) and IEEE G8275.2 (Partial Timing Support) standards. Said standards are dependent on GPS/GNSS signal received via satellite as main source and these standards only define a mediocre network based solution. An external dependence occurs for phase and frequency synchronization as satellites providing GPS/GNSS signals are for most countries completely foreign and some are managed militarily. In addition, a satellite signal is weak~-160 dBm and/or when there are adverse weather conditions, when jammers are used, synchronization can also fail easily. (Generally used in military exercises)

The related art as suggested by these IEEE and ITU-T standards are standby measures in case of synchronization failures by GPS/GNSS. To cope with these standards as advised by IEEE and ITU-T, high level of investment and operation costs are required for application of said standby measures protocols.[4] Despite these investments, experiencing inefficiencies due to characteristics of core networks indicates that such standby measures are not fully safe. GPS/GNSS requires a failover system however the failover system must be robust as well, the IEEE and ITU-T determined standard is also not robust thus another semi-safe system as standby for a semi-safe system fails to meet requirements for particularly critical networks, and unsafe conditions are seen widely in literature. [5] [6] [7] [8]

As a result, due to above-described disadvantages and inadequacy of existing solutions, it has been necessary to make development in the related art.

Purpose of the Invention

The invention has been developed with inspiration from existing situations and aims to eliminate the above-mentioned disadvantages.

Primary purpose of the invention is to transmit phase and frequency synchronization in a DTM layer operating over a IP/MPLS network instead of transferring phase and frequency synchronization in current IP/MPLS networks by the use of PTP (IEEE 1588) and defined by ITU-T 8275.x.

Another purpose of the invention is to provide phase and frequency synchronization without causing any additional investment and operating cost for existing networks.

In order to achieve above described purposes, the invention is a new method to provide phase and frequency synchronization in IP/MPLS network without need for ITU-T G8275.1 (Full Timing Support) and IEEE G8275.2 (Partial Timing Support) standards and without any investment for applying such standards and the method comprises process steps of switching of PPS/PPS Plus string signal by means of DTM protocol, transmission of PPS/PPS Plus string signal to other end of network through a virtual circuit, switching the transmitted PPS/PPS Plus string signal again by means of DTM protocol, conversion of PPS/PPS Plus string signal arriving at other end to ToD and PTP data and transmission there of to the terminating component.

The system where above mentioned method is used comprises; a clock time that gives ToD (time of day) output, PPS/PPS Plus string and or PTP or ToD output; a transmitter mechanism converting ToD and PTP data into PPS/PPS Plus string signal on one end of network and then switching by DTM protocol; a receiver mechanism transmitting PPS/PPS Plus string signal to terminal component by switching PPS/PPS Plus string signal by DTM protocol and by converting into ToD and PTP data on other end of network; and a virtual circuit providing carriage of PPS signal from one end to the other.

The structural and characteristics features of the invention and all advantages will be understood better in detailed descriptions with the figures given below and with reference to the figures, and therefore, the assessment should be made taking into account the said figures and detailed explanations.

DESCRIPTION OF PART REFERENCES

Figure 1:
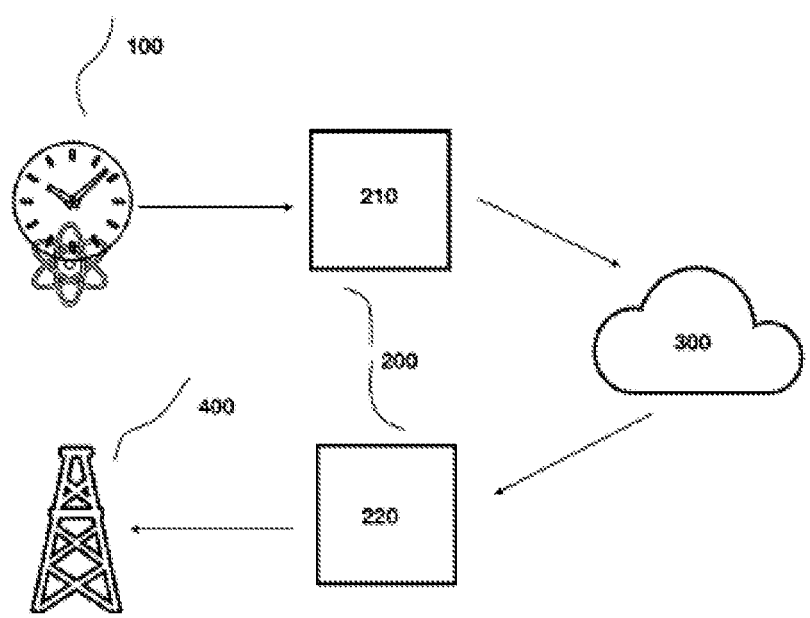
FIG. 1 is a schematic view of an embodiment of the system providing phase and frequency synchronization of the invention.

100. Atomic clock
210. Transmitter mechanism
  211. Primary converter device
  212. Primary switching device
220. Receiver mechanism
  221. Secondary converter device
  222. Secondary switching device
300. Virtual circuit
400. Terminal component

DETAILED DESCRIPTION OF THE INVENTION

In this detailed description, the preferred embodiments of a method and system providing phase and frequency synchronization disclosed under the invention have been disclosed solely for the purpose of better understanding of the subject.

The method disclosed hereunder is basically about transmission of ToD (time of day) and/or PTP protocol data or PPS signal received from atomic clock (100) to the terminal component (400) located in receiver part. ToD and PTP data are converted into PPS during said transmission process and carried through virtual circuit (300). Switching operation is performed by DTM protocol during said process.

Process steps of method disclosed under the invention are described briefly below:
- switching PPS/PPS Plus string signal through DTM protocol,
- carriage of PPS/PPS Plus string signal to other end of network via a virtual circuit (300),
- switching transmitted PPS/PPS Plus string signal again through DTM protocol,
- transmitting of PPS/PPS Plus string signal received at other end to terminal component (400) by being convert into ToD (time of day) and/or PTP data.

In the method disclosed hereunder, PPS signal can be received from an atomic clock (100) which gives output in this way, PPS signal as well as obtained by means of converting ToD and PTP data received from an atomic clock (100) which gives ToD (time of day) output into PPS/PPS Plus string signal.

FIG. 1 is a schematic view of an embodiment of the system providing phase and frequency synchronization of the invention. The atomic clock (100) shown here receives ToD (time of day) and can output PTP as described by IEEE (1588v2). The PTP data received from it is firstly converted into PPS/PPS plus string signal by means of a PCB (printed circuit board) designed for this (210) and the converted signal is switched via DTM protocol. PPS signal is carried to other end of network by help of a DIM virtual circuit (300). PPS signal delivered to other end of the network by the DIM virtual circuit (300) is firstly switched at DTM protocol by help of a received mechanism (220) therein and then converted into PTP data by means of a PCB (printed circuit board) designed for this containing the Phase and Frequency Synchronisation and additional ToD. The converted data are thus delivered to terminal component (400) which is the last component on the receiver part.

In addition to this embodiment, an atomic clock (100) giving PPS/PPS plus string output can be used in the system. In such embodiment, the transmitter mechanism (210) only performs switching of PPS signal that received by transmitter mechanism (210).

Figure 2:
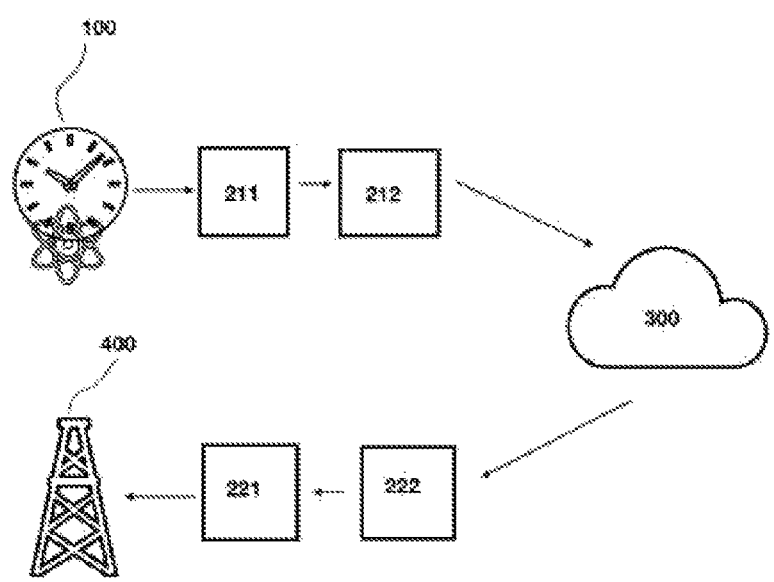
FIG. 2 is a schematic view of another embodiment of the system providing phase and frequency synchronization of the invention.

FIG. 2 is a schematic view of another embodiment of the system providing phase and frequency synchronization of the invention. In said embodiment, differently from the embodiment shown in FIG. 1, conversions of PTP-PSP and switching at DTM protocol are made by separate devices instead of an internal PCB (printed circuit board) addition designed for this. In this embodiment, the transmitter mechanism (210) in initial part of the system comprises a primary converter device (211) converting ToD and PTP data into PPS signal and a primary switching device (212) switching PPS signal by DTM protocol. In this embodiment, similarly, said receiver mechanism (220) provided in other part of the system comprises a secondary switching device (222) switching PPS signal by DIM protocol and a secondary converter device (221) converting PPS signal into ToD and PTH data and transmitting to terminal component (400). As seen, in the system disclosed under the invention, operations of PTP-PPS conversion and switching by DTM protocol can be performed by an integrated single device as well as each operation can also be made by separate devices.

Figure 3:
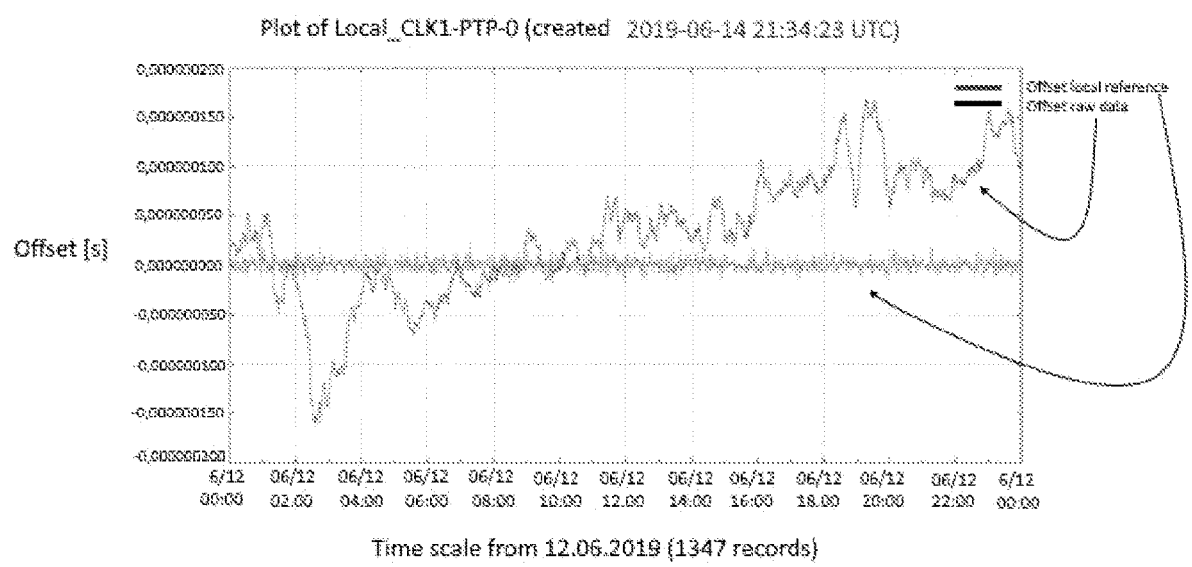
FIG. 3 is a view of test results of the system providing phase and frequency synchronization of the invention.

FIG. 3 is a view of test results of the system providing phase and frequency synchronization of the invention. As seen, at least 10 times more efficiency is gained in comparison to systems available in the related art.

REFERENCES

[1] Synchronization challenges in packet-based Cloud-RAN fronthaul for mobile networks
Published: 2015 IEEE International Conference on Communication Workshop (ICCW)
Author(s): Aleksandra Checko, Anders Christian Juul, Henrik L. Christiansen, Michael S. Berger.

[2] Synchronization Requirements for 5G: An Overview of Standards or Specifications for Cellular Networks
Published: IEEE Vehicular Technology Magazine
Author(s): Jia-Chin Lin

[3] A Case for Assisted Partial Timing Support Using Precision Timing Protocol Packet Synchronization for LTE-A
Published: 2014, IEEE
Author(s): Tim Pearson and Kishan Shenoi

[4] The road to 5G: The inevitable growth of infrastructure cost
Published: 2018 Mckinsey
Author(s): Grijpink, Alexandre Ménard, Halldor Sigurdsson, Nemanja Vucevic

[5] Global Navigation Space Systems: Reliance and Vulnerabilities.
Published: 2011, Royal Academy of Engineering
Author(s): Dr. Martyn Thomas

[6] The economic impact on the UK of a disruption to GNSS
Published: 2017, London Economics
Author(s): Greg Sadlier, Rasmus Flytkjærr, Farooq Sabri, Daniel Herr

[7] National Risk Estimate: Risks to United States Critical Infrastructure from Global Positioning System Disruptions Published: 2011, Department of Homeland Security
Author(s): Brandon D. Wales

[8] Performance Characterization of GNSS/IMU/DVL Integration under Real Maritime Jamming Conditions
Published: 2018 MDPI, Basel, Switzerland
Author(s): Ralf Ziebold, Daniel Medina, Michailas Romanovas, Christoph Lass, Stefan Gewies

The invention claimed is:

1. A method providing phase and frequency synchronization in internet protocol/multiprotocol label switching (IP/MPLS) network, comprising the process steps of:
   switching a pulse per second (PPS) signal by dynamic synchronous transfer mode (DTM) protocol at a first end of a network;
   transmitting the PPS signal from the first end to an other end of the network through a virtual circuit operated by a DTM layer over the IP/MPLS network,
   switching the transmitted PPS signal at the other end by the DTM protocol;

converting the transmitted PPS signal arriving at the other end to time of day (ToD) and precision transfer protocol (PTP) data; and transmitting the ToD and PTP data to a terminal component.

2. A method providing phase and frequency synchronization according to claim 1, comprising the process step of conversion of ToD and PTP data received from an atomic clock in order to obtain PPS signal.

3. A system providing phase and frequency synchronization in internet protocol/multiprotocol label switching (IP/MPLS) network, comprising
- a transmitter mechanism switching a pulse per second (PPS) signal by dynamic synchronous transfer mode (DTM) protocol at a first end of a network and transmitting the PPS signal from the first end to an other end of the network,
- a receiver mechanism transmitting the PPS signal to a terminal component by switching the PPS signal at the other end via the DTM protocol and converting the arrived transmitted PPS signal into time of day (ToD) and precision transfer protocol (PTP) data at the other end of the network, and
- a virtual circuit, operated by a DTM layer over the IP/MPLS network, providing carriage of the transmitted PPS signal from the firsts end to the other end.

4. A system providing phase and frequency synchronization according to claim 3, comprising an atomic clock giving a ToD and PTP output and said transmitter mechanism converting the ToD and PTP data received from said atomic clock into PPS signal.

5. A system providing phase and frequency synchronization according to claim 4, wherein said transmitter mechanism comprises a primary converter device converting the ToD and PTP data from said atomic clock into PPS signal and a primary switching device conducting switching of the PPS signal by DTM protocol.

6. A system providing phase and frequency synchronization according to claim 3, wherein said receiver mechanism comprises a secondary switching device switching the PPS signal at the other end by DTM protocol and a secondary converter device converting the arrived transmitted PPS signal into the ToD and PTP data and performing the transmitting to the terminal component.

7. A system providing phase and frequency synchronization according to claim 4, wherein said receiver mechanism comprises a secondary switching device switching the arrived transmitted PPS signal by DTM protocol and a secondary converter device converting PPS signal into the ToD and PTP data and performing the transmitting to the terminal component.

8. A system providing phase and frequency synchronization according to claim 5, wherein said receiver mechanism comprises a secondary switching device switching the PPS signal at the other end by DTM protocol and a secondary converter device converting the arrived transmitted PPS signal into the ToD and PTP data and performing the transmitting to the terminal component.

* * * * *